United States Patent [19]

Clay

[11] 4,371,136

[45] Feb. 1, 1983

[54] PRODUCT LOADING ARM STORAGE KEEPER

[75] Inventor: Roger D. Clay, Bartlesville, Okla.

[73] Assignee: Phillips Petroleum Company, Bartlesville, Okla.

[21] Appl. No.: 209,927

[22] Filed: Nov. 24, 1980

[51] Int. Cl.³ .................. F16L 3/00

[52] U.S. Cl. .................. 248/49; 141/387; 222/538; 285/61

[58] Field of Search .................. 141/279, 284, 84, 94, 141/369-389, 392; 222/530, 538; 248/79, 49; 285/61

[56] References Cited

U.S. PATENT DOCUMENTS

| | | | |
|---|---|---|---|
| 198,895 | 1/1878 | Meharry | 212/254 |
| 344,652 | 6/1886 | Hammerstein | 348/292.1 |
| 426,372 | 4/1890 | Field et al. | 212/254 |
| 821,733 | 5/1906 | Peck | 248/292.1 |
| 2,006,194 | 6/1935 | Bertschinger | 222/530 |
| 2,008,642 | 7/1935 | Hughes | 222/538 |
| 2,017,133 | 10/1935 | Rice | 222/538 |
| 2,578,036 | 12/1951 | Berke | 222/538 |
| 2,641,385 | 6/1953 | Rives | 222/530 |
| 2,741,406 | 4/1956 | Matson | 222/538 |
| 3,260,424 | 7/1966 | Mankin et al. | 222/530 |
| 3,705,610 | 12/1972 | Baudras | 141/387 |

FOREIGN PATENT DOCUMENTS 167158 11/1950 Austria .

OTHER PUBLICATIONS

EMCO-Wheaton Catalog, 5 Misc. Pages.
Chiksan Company Catalog, Table of Contents, pp. 5-7 and 15.

*Primary Examiner*—Houston S. Bell, Jr.

[57] ABSTRACT

A loading arm assembly of the type which includes a generally vertical tubular loading riser having a tubular swivel joint on the upper end portion thereof to which is connected one end of a tubular loading arm, the tubular loading arm being adapted to revolve about a generally horizontal axis and to revolve about a generally vertical axis via the swivel joint, with the loading arm assembly being further provided with biasing apparatus for continuously urging the revolution of the loading arm upwardly about the generally horizontal axis. The loading arm assembly further includes a loading arm keeper which comprises a rigid arm having first and second end portions, with a clamp on the first end portion of the rigid arm for securing the first end portion of the rigid arm to the generally vertical loading riser with the rigid arm extending outwardly from the pipe loading riser, and with a loading arm retainer on the second end portion of the rigid arm for selectively engaging the tubular loading arm so as to resist the upward revolution of the tubular loading arm about the generally horizontal axis responsive to the biasing apparatus, and to prevent revolution of the tubular loading arm about the generally vertical axis.

9 Claims, 3 Drawing Figures

PRODUCT LOADING ARM STORAGE KEEPER

This invention relates generally to product loading apparatus. In one aspect this invention relates to storage of product loading apparatus.

In the loading of various fluid materials it is common to utilize apparatus known as arm loaders which employ two or more rigid tubular conduits mutually interconnected by tubular swivel joints which permit swiveling movement between such conduits about two axes, generally a horizontal axis and a vertical axis. It is also common to utilize two or more such arm loaders in relative close proximity to one another in environments such as oil and gas terminals. Under such conditions, it is desirable to provide convenient and secure means for storing those arm loaders which are not in use in positions which will not interfere with the use of other arm loaders proximate thereto. The present invention is directed to the provision of product loading arm storage apparatus which meets these needs.

The present invention contemplates a loading arm keeper for use with a loading arm assembly which includes first and second tubular portions connected by a tubular swivel. The loading arm keeper includes a rigid arm having first and second end portions. Clamp means are provided on the first end portion of the rigid arm for securing the first end portion of the rigid arm to the first tubular portion of the loading arm assembly. Loading arm retainer means are provided on the second end portion of the rigid arm for selectively engaging the second tubular portion of the loading arm assembly so as to restrict movement of the second tubular portion of the loading arm assembly relative to the first tubular portion of the loading arm assembly via the tubular swivel.

An object of the invention is to increase the efficiency of operation of loading arm assemblies.

Another object of the invention is to facilitate the storage of loading arm assemblies.

A further object of the invention is to increase the safety of operation of multiple loading arm assemblies at a common loading location.

A still further object of the invention is to provide a loading arm storage keeper which is economical in construction.

Still another object of the invention is to provide a loading arm storage keeper which is simple and convenient to install and adjust.

Yet another object of the invention is to provide a loading arm storage keeper which can be simply and conveniently installed on existing loading arm assemblies.

A further object of the invention is to provide a loading arm storage keeper which is simple and convenient to operate.

Figure 1:
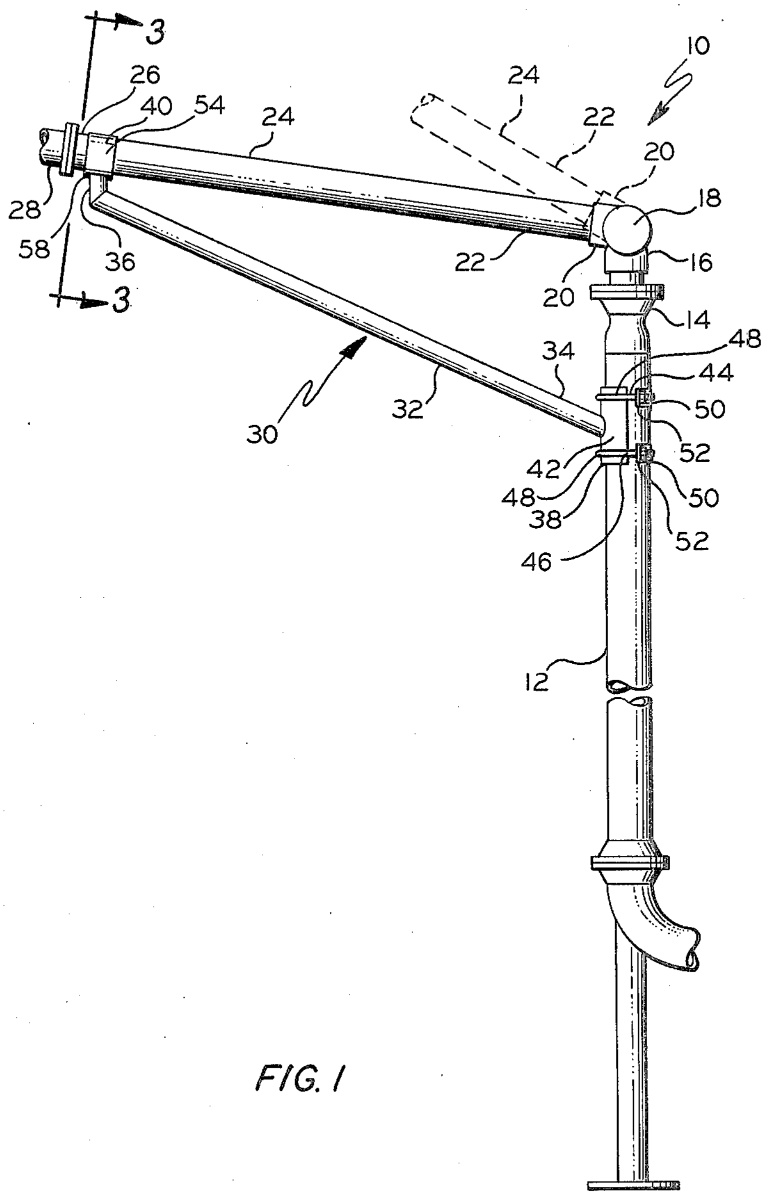
Figure 2:
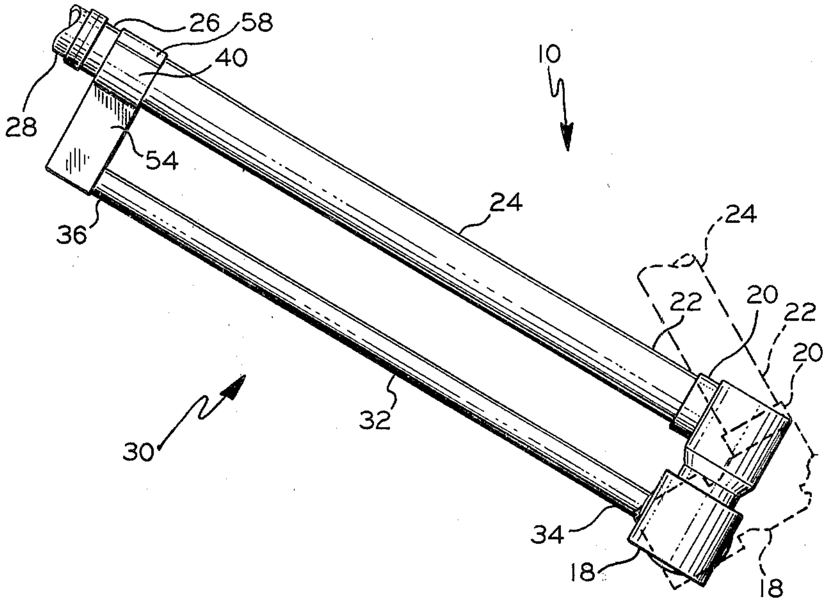
Figure 3:
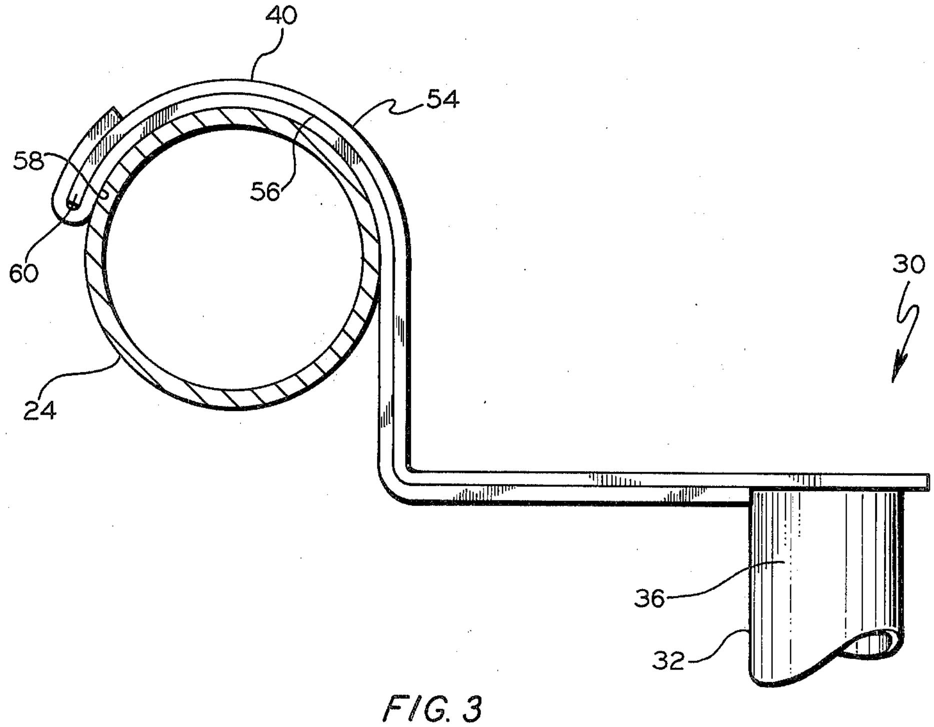

Other objects and aspects of the invention will be readily apparent to those skilled in the art from a reading of the following detailed description and claims, together with the accompanying drawings in which:

FIG. 1 is a side elevation view of a loading arm keeper constructed in accordance with the present invention and shown installed on a loading arm assembly, with the loading arm assembly shown in solid lines in a first position restrained by the loading arm keeper and shown in phantom lines in a second unrestrained position;

FIG. 2 is a top plan view of the loading arm keeper and loading arm assembly of FIG. 1, with the loading arm assembly shown in solid lines in the first position restrained by the loading arm keeper and shown in phantom lines in the second unrestrained position; and FIG. 3 is an enlarged cross-section taken along line 3—3 of FIG. 1 illustrating details of construction of the saddle member of the loading arm keeper.

Referring now to the drawings, a product loading arm assembly is disclosed therein and is generally designated by the reference character 10. The loading arm assembly 10 includes a generally vertical tubular loading riser 12, the upper end portion 14 of which is connected in product flow communication with the inlet end portion 16 of a tubular swivel joint 18. The outlet end portion 20 of the tubular swivel joint 18 is in turn connected in product flow communications with one end 22 of a tubular loading arm 24. The opposite end 26 of the tubular loading arm 24 is preferably adapted to be connected in product flow communication with some other form of tubular conduit 28 which may be considered a part of the product loading arm assembly 10, but which is not essential to an understanding of the structure and operation of the invention. The tubular swivel joint 18 is of conventional construction and is of the general type which is adapted to permit the tubular loading arm 24 to revolve relative to the swivel joint 18 about a generally horizontal axis as well as to revolve about a generally vertical axis with reference to FIG. 1. Revolution of the tubular loading arm 24 about a generally horizontal axis of revolution is illustrated in FIG. 1 by means of phantom lines, while revolution of the tubular loading arm about a generally vertical axis of revolution is illustrated in FIG. 2, also by means of phantom lines.

The tubular swivel joint 18 is further characterized as being biased by suitable conventional means (not shown) for continuously urging the revolution of the tubular loading arm 24 upwardly about the generally horizontal axis of revolution, thus slightly overcoming the dead weight of the cantilevered tubular loading arm 24 and tubular conduit 28 at all times.

It is desirable for the operator of the product loading arm assembly 10 to be able to place the assembly in a convenient and secure storage position when the assembly is not in use so as to facilitate the use of adjacent similar assemblies. In general it is most advantageous to position a loading arm assembly 10 which is not in service in a storage position such that the tubular loading arm 24 is depressed about its horizontal axis of revolution in comparison to the tubular loading arm of an adjacent product loading arm assembly which is in use so that the tubular loading arm of such adjacent product loading arm assembly can be elevated about its generally horizontal axis revolution and revolved about its generally vertical axis of revolution without interference with the stored product loading arm assembly which is not in service.

To facilitate such storage, the product loading arm assembly 10 is further provided with a loading arm keeper assembly 30. The loading arm keeper assembly 30 comprises a rigid arm 32, having a first end portion 34 and a second end portion 36, with clamp means 38 on the first end portion 34 for securing the first end portion of the rigid arm to the loading riser 12, and with loading arm retainer means 40 on the second end portion 36 for selectively engaging the tubular loading arm 24 so as to restrict movement of the tubular loading arm 24 relative to the vertical tubular loading riser 12 via the tubular swivel joint 18.

Clamp means 38 includes a generally U-shaped clamp member 42 fixedly secured, as by welding, to the first end portion 34 of the rigid arm 32. The clamp member 42 is sized and shaped to be closely received about a portion of the outer surface of the tubular loading riser 12, as shown in FIG. 1. The loading riser 12 is preferably provided with a generally cylindrical outer surface and the clamp member 42 is preferably provided with a generally cylindrical inner surface which conforms to the generally cylindrical outer surface of the loading riser 12 and extends around approximately one half the circumference of the generally cylindrical outer surface of the loading riser 12. The clamp member 42 is preferably secured to the loading riser 12 by a pair of conventional U-bolt clamp assemblies 44 and 46. Each clamp assembly includes a threaded U-bolt 48, a pair of threaded nuts 50 and a clamp bar 52 through which the threaded ends of the corresponding U-bolt 48 extend and are threadedly engaged by the corresponding nuts 50. The use of the U-bolt clamp assemblies 44 and 46 to secure the loading arm keeper assembly 30 to the loading riser 12 permits simple and convenient adjustment of the assembly 30 vertically on the loading riser 12, and further permits simple and convenient horizontal adjustment of the assembly 30 by revolving it about the vertical center line of the loading riser 12 until the optimum desired position is achieved, at which time the U-bolt clamp assemblies 44 and 46 can be tightly secured about the mutually encircled and engaged clamp member 42 and loading riser 12.

Loading arm retainer means 40 includes a saddle member 54 fixedly secured, as by welding, to the second end portion 36 of the rigid arm 32. The saddle member 54 is provided with a downwardly opening, generally U-shaped portion 56. A resilient protective pad 58 is fixedly secured along the lower surface of the saddle member 54 and covers the entire downwardly facing surface of the U-shaped portion 56, as shown in FIG. 3. The pad 58 provides means for protecting the outer surface of the tubular loading arm 24. The pad 58 is preferably doubled back over the outer end portion 60 of the saddle member 54, and extends therefrom across the downwardly opening, generally U-shaped portion 56 to a point abutting the second end portion 36 of the rigid member 32. The U-shaped portion 56 of the saddle member 54, with the pad 58 secured thereto, is sized and shaped to generally conform to the upper outer surface of the tubular loading arm 24 adjacent thereto, as best shown in FIG. 3.

The rigid arm 32 can be suitably constructed of steel pipe, e.g., 2-inch Schedule 40 pipe. The clamp member 42 and saddle member 54 can each be constructed of ¼-inch steel plate. The resilient protective pad 58 can be suitably constructed of ¼-inch rubber sheet and can be suitably secured to the saddle member 54 by means of a plurality of ⅜-inch flat head cap screws, or by means of a suitable cement.

In operation, the tubular loading arm 24 of the product loading arm assembly 10 is moved out from under and away from the saddle member 54 of the loading arm retainer means 40, as is shown by the phantom lines in FIGS. 1 and 2, thus permitting free movement of the product loading arm assembly 10 to facilitate product loading therethrough. When the product loading arm assembly 10 is out of service, it can be conveniently and securely stored out of the way of other product loading arm assemblies by manually lowering the end 26 of the loading arm 24 against the upward bias of the tubular swivel joint 18 to a position lower than the U-shaped portion 56 of the saddle member 54, and swinging the loading arm 24 about the vertical axis of revolution of the tubular swivel joint 18 to a position directly under the U-shaped portion 56 of the saddle member 54, and releasing the loading arm 24 whereby the upward bias of the tubular swivel joint 18 urges the tubular loading arm 24 upwardly into a securely stored position within the U-shaped portion 56 of the saddle member 54, as shown by the solid lines in FIGS. 1 and 2. When so stored, the tubular loading arm 24 is preferably elevated slightly above the horizontal about the horizontal axis of revolution of the tubular swivel joint 18.

From the foregoing description it will be seen that the loading arm keeper assembly 30 provides convenient and secure storage means for a product loading arm assembly which facilitates the use of adjacent similar product loading arm assemblies.

Changes can be made in the combination and arrangement of parts or elements as heretofore set forth in the specification and shown in the drawings without departing from the spirit and scope of the invention as defined in the following claims.

That which is claimed:

1. A loading arm keeper for use with a loading arm assembly including first and second tubular portions connected by a tubular swivel, comprising:

a rigid arm having first and second end portions;

clamp means on the first end portion of said rigid arm for securing the first end portion of said rigid arm to said first tubular portion of said loading arm assembly; and loading arm retainer means on the second end portion of said rigid arm for selectively engaging said second tubular portion of said loading arm assembly so as to restrict movement of said second tubular portion of said loading arm assembly relative to said first tubular portion of said loading arm assembly via said tubular swivel, said loading arm retainer means comprising a generally U-shaped saddle member fixedly secured to the second end portion of said rigid arm and sized and shaped to generally conform to the outer surface of said second tubular portions of said loading arm assembly.

2. A loading arm keeper in accordance with claim 1 wherein said clamp means is characterized further to include a generally U-shaped clamp member fixedly secured to the first end portion of said rigid arm and sized and shaped to be closely received about at least a portion of said first tubular portion of said loading arm assembly, and means for rigidly securing said generally U-shaped clamp member to said first tubular portion of said loading arm assembly.

3. A loading arm keeper in accordance with claim 2 wherein said clamp means is characterized further to include at least one U-bolt clamp assembly encircling and mutually engaging said u-shaped clamp member and said first tubular portion of said loading arm assembly.

4. A loading arm keeper in accordance with claim 1 wherein said loading arm retainer means is characterized further to include resilient protective pad means secured to at least a portion of said generally U-shaped saddle member for protecting the outer surface of said second tubular portion of said loading arm assembly when selectively engaged by said loading arm retainer means.

5. In a loading arm assembly of the type which includes a generally vertical tubular loading riser having tubular swivel joint means on the upper end portion thereof to which is connected one end of a tubular loading arm, said tubular loading arm being adapted to revolve about a generally horizontal axis and to revolve about a generally vertical axis via said swivel joint means, and which loading arm assembly further includes bias means for continuously urging the revolution of said loading arm upwardly about said generally horizontal axis, the improvement comprising:

a rigid arm having first and second end portions;

clamp means on the first end portion of said rigid arm for securing the first end portion of said rigid arm to said generally vertical tubular loading riser with said rigid arm extending outwardly from said tubular loading riser; and loading arm retainer means on the second end portion of said rigid arm for selectively engaging said tubular loading arm so as to resist the upward revolution of said tubular loading arm about said generally horizontal axis responsive to said bias means, and to prevent revolution of said tubular loading arm about said generally vertical axis.

6. A loading arm assembly in accordance with claim 5 wherein said clamp means is characterized further to include a generally U-shaped clamp member fixedly secured to the first end portion of said rigid arm and sized and shaped to be closely received about at least a portion of the outer surface of said generally vertical tubular loading riser, and means for rigidly securing said generally U-shaped clamp member to the outer surface of said generally vertical tubular loading riser.

7. A loading arm assembly in accordance with claim 6 wherein said means for rigidly securing said generally U-shaped clamp member is characterized further to include at least one clamp encircling and mutually engaging said generally U-shaped clamp member and said generally vertical tubular loading riser.

8. A loading arm assembly in accordance with claim 5 wherein said loading arm retainer means is characterized further to include a generally downwardly opening generally U-shaped saddle member fixedly secured to the second end portion of said rigid arm and sized and shaped to generally conform to the outer upper surface of said tubular loading arm.

9. A loading arm assembly in accordance with claim 8 wherein said loading arm retainer means is characterized further to include resilient protective pad means secured to at least a portion of the downwardly facing portion of said generally U-shaped saddle member for protecting the outer surface of said tubular loading arm when selectively engaged by said loading arm retainer means.

* * * * *